United States Patent [19]

Hart et al.

[11] 4,048,616
[45] Sept. 13, 1977

[54] PATTERN RECOGNITION SYSTEM WITH KEYBOARD ENTRY FOR ADAPTIVE SENSITIVITY

[75] Inventors: Donald J. Hart, Merion; John C. Bouton, Jr., Doylestown; Eugene H. Poppel, Philadelphia, all of Pa.

[73] Assignee: Geometric Data Corporation, Wayne, Pa.

[21] Appl. No.: 637,266

[22] Filed: Dec. 3, 1975

[51] Int. Cl.² .............................................. G06K 9/00
[52] U.S. Cl. .................... 340/146.3 ED; 340/146.3 B
[58] Field of Search ................... 340/146.3 T; 356/39;
    340/146.3 B, 146.3 T, 146.3 AC, 146.3 ED;
    235/92 PC, 92 DP; 235/151.3; 356/39

[56] References Cited
U.S. PATENT DOCUMENTS

| | | | |
|---|---|---|---|
| 3,156,894 | 11/1964 | Greanias | 340/146.3 ED |
| 3,602,902 | 8/1971 | Madden | 340/172.5 |
| 3,832,687 | 8/1974 | Miller et al. | 340/146.3 AC |
| 3,922,532 | 11/1975 | Kitchener et al. | 235/92 PC |

*Primary Examiner*—Joseph M. Thesz
*Attorney, Agent, or Firm*—Caesar, Rivise, Bernstein & Cohen, Ltd.

[57] ABSTRACT

A blood cell recognition system is provided which includes scanning means for generating signals representative of a pattern in a whole blood smear scanned by the scanning means. Means for examining the signals from the scanning means for generating parameters of the pattern scanned are provided with pattern recognition means responsive to the parameters for identifying the pattern scanned and an operator keyboard for entering data relating to the pattern scanned. An interface is provided between the means for examining and the pattern recognition means which includes first temporary storage means for receiving parameters relating to a cell being scanned, and second temporary storage means for receiving data from said keyboard and buffer storage means for entry of said parameters and said data into said pattern recognition means to enable the pattern recognition means to recognize the pattern in accordance with both the parameters and the data. The data relates to a previous blood cell scanned and the parameters relate to the present blood cell scanned.

10 Claims, 6 Drawing Figures

PATTERN RECOGNITION SYSTEM WITH KEYBOARD ENTRY FOR ADAPTIVE SENSITIVITY

This invention relates generally to pattern recognition systems and more particularly to a pattern recognition system with keyboard entry for adaptive sensitivity. Pattern recognition system have now become a practical reality to make a completely automatic differential white cell count in blood. It has been found that for providing blood cell differential counts in normal whole blood smears, systems of the type shown in U.S. Pat. No. 3,873,943 and U.S. Pat. No. 3,832,687 the systems can readily distinguish between various white cells in a blood smear in order to make a differential while cell count in blood. The systems shown in U.S. Pat. 3,873,974 shows how to efficiently scan a whole blood smear without missing any white cells and avoiding unnecessary time examining the patterns in a whole blood smear other than the while cells. U.S. Pat. No. 3,832,687 shows a system which enables the classification of different patterns in accordance with the shape of the patterns. The system is primarily designed for distinguishing between various white cells in a blood smear in order to make a differential white cell count in blood. The system utilizes a statistical analysis which provides parameters which parameters are then utilized in combination with a decision logic tree to define a specific type of cell which has been scanned.

It has been found through experimentation that one of the most important functions of an automatic blood cell differential analyzer is to be able to determine the abnormal cells which are present in the whole blood smear which is important to the determination of disease, as is the distribution of white cells in a whole blood smear.

It should be noted that a whole blood smear is normally provided on a slide and the whole blood smear is then dyed with a Wright Stain which utilizes two dye components eosin and methylene blue. From slide to slide there is normally a variance between the amount of dye that is absorbed by the whole blood smear and, accordingly, the color of the cells from slide to slide may vary, which acts to make more difficult the identification of the white blood cells in a whole blood smear.

Another problem that has encountered in the automatic blood cell analysis is slight variations from the blood of one person to another. Accordingly, while a person may have a normal blood cell distribution, one or more of the blood cells may be slightly different in shape from the average blood cell but, nonetheless, healthy. When an operator examines the blood cell of this type, the opertor knows that it is a healthy blood cell and each time the operator encounters the blood cell, the operator just merely counts it as one of a particular type. However, in an automatic system, each time the blood cell is encountered it will be accounted for as a suspect.

It is therefore an object of this invention to overcome the problems in the art.

Still another object of the invention is to provide a new an improved blood cell recognition system which includes keyboard entry for insertion of contextural information.

Yet another object of the invention is to provide a new and improved pattern recognition system with keyboard entry for adaptive sensitivity of the pattern recognition system to specific characteristics of a whole blood smear.

These and other objects of the invention are achieved by providing in a blood cell recognition system scanning means for generating signals representative of a pattern in a whole blood smear scanned. Means are also provided for examining the signals from the scanning means for generating parameters of the pattern scanned. Pattern recognition means are provided which are responsive to the parameters for identifying the pattern scanned and an operator keyboard is also provided for entering data relating to patterns scanned. An interface is provided between the means for examining and the pattern recognition means. The interface includes first temporary storage means for receiving parameters relating to a cell being scanned and second temporary storage means for receiving data from the keyboard and buffer storage means for entry of the parameters and the data into the pattern recognition means to enable the pattern recognition means to recognize the pattern in accordance with both the parameters and the data. The data relates to a previous blood cell scanned and the parameters relate to the present blood cell scanned.

Other objects and many of the attendant advantages of this invention will be readily appreciated as the same becomes better understood by reference to the following detailed description when considered in connection with the accompanying drawing wherein.

Figure 1:
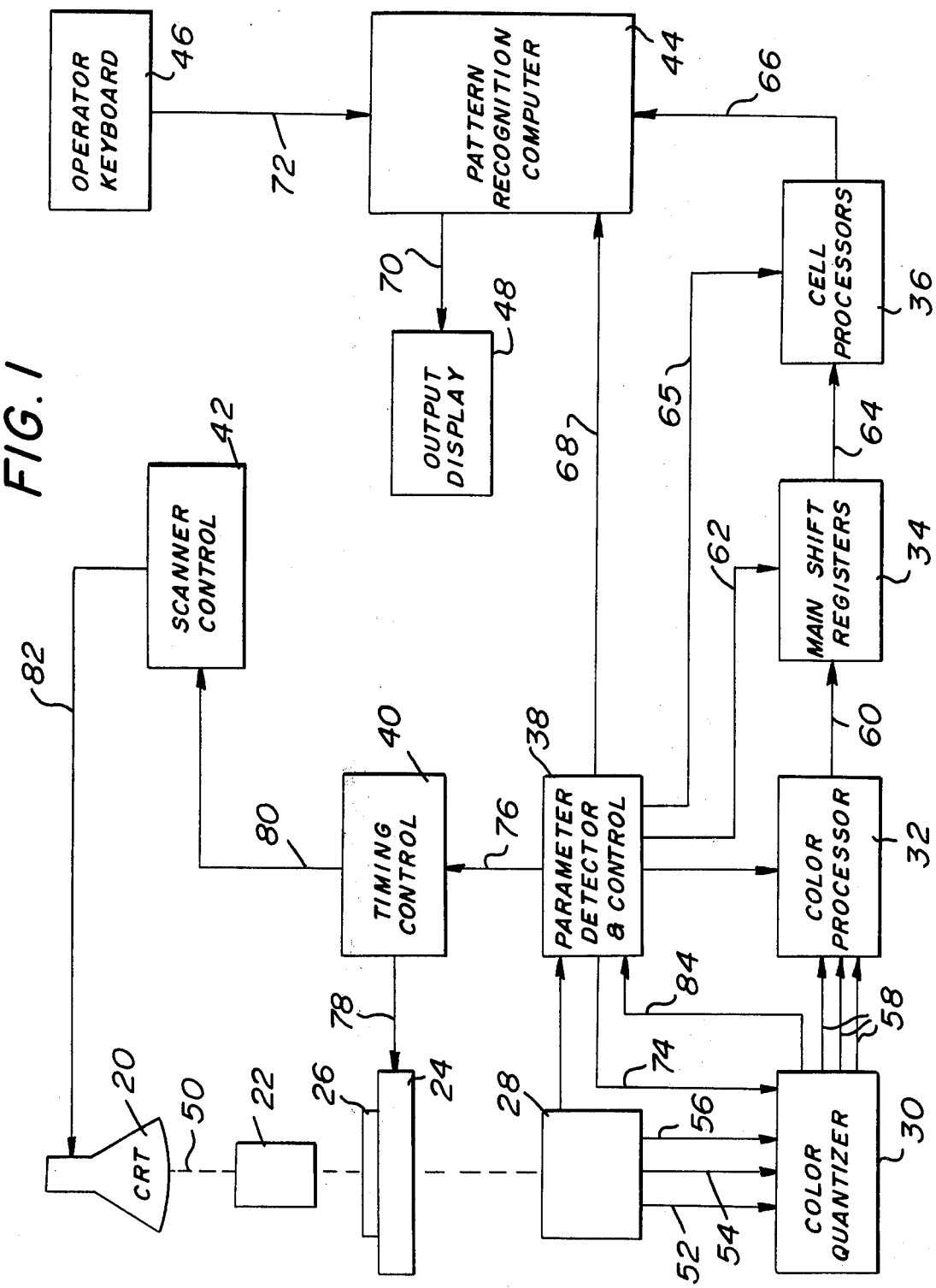
FIG. 1 is a schematic block diagram of a pattern recognition system embodying the invention.

Referring now in greater detail to the various figures of the drawing wherein like reference numerals refer to like parts, a pattern recognition system embodying the invention is shown generally in FIG. 1. The pattern recognition system in FIG. 1 is adapted to provide a differential while blood cell count from a whole blood smear. The system includes a flying spot scanner optical system which includes a cathode ray tube 20, a microscopic lens system 22, a platform 24 for supporting a glass slide 26 having a whole blood smear thereon, a light component separator 28, a color quantizer 30, a color processor 32, main shift registers 34, cell processors 36, parametr detector and control 38, a timing control 40, a scanner control 42, a pattern recognition computer 44, an operator keyboard 46 and an output display 48.

The cathode ray tube (CRT) 20 and the microscopic lens system 22 ar preferably mounted within a housing which is light sealed so that a beam of light 50 can be directed through the microscopic lens system for focusing on slide 26. Similarly, the platform 24 and the light component separator 28 are also encased in a housing to prevent light, other than the beam of light 50, from entering the light component separator 28. The platform 24 includes an opening through which the beam of light 50 is directed to the light component separator 28.

The beam of light 50 is produced by the cathode ray tube 20 which provides the beam in approximately a 3 × 3 raster on the face of the cathode ray tube which is directed and focused by the microscopic lens system 22 down to a field of the size approximately 300 micron × 300 micron. Thus, a scan raster of light is directed at the slide 26 to traverse approximately a 300 micron × 300 micron field in the blood smear.

The light passing through the slide 26 is directed to the light component separator 28 which filters the incoming beams and provides light through three spectral channels.

The output signals representative of each of the three light channels is provided on the output lines 52, 54 and 56 of the light component separator 28 which are connected to the input of the color quantizer 30. The color quantizer 30 takes the analog signals on lines 52, 54 and 56 and provides quantized signals representative of the various color channels on output lines 58, which are connected to the input of the color processor 32. The light component separator 28, the color quantizer 30 and the color processor 32 are the subject of U.S. Pat. No. 3,827,804, issued on Aug. 6, 1974 for Color Separation for Discrimination in Pattern Recognition Systems. The disclosure of this patent is incorporated by reference herein.

The output of the color processor 32 is provided on output line 60 to the main shift registers 34. The main shift registers 34 have the binary quantization of the scanned cell shifted through the main shift registers 34 and these signals are examined by the parameter detector and control 38 which connected to the main shift registers via lines 62. The output of the main shift registers 34 is provided to the cell processors 36 via line 64. The parameter detector and control is also connected to the cell processors via line 65. The output of the cell processor 36 is connected to the pattern recognition computer via lines 66 and the exchange of data between the parameter detector and control 38 and the pattern recognition computer 44 is via line 68. The pattern recognition computer is also connected via output lines 70 to the output display 48. Also connected to the pattern recognition computer is the pattern keyboard 46, which is connected via input lines 72 to the pattern recognition computer.

The parameter detector and control which examines the signals provided to the main shift register also provides control signals to the color quantizer via line 74 to the timing control via line 76. The output of the timing control 40 is connected via line 78 to the platform 24 and via lines 80 to the scanner control. The scanner control 42 has its output line 82 connected to the input of cathode ray tube 20. The timing control 40 provides shift pulses to the platform 24 which includes a stepping motor for moving the platform 24 in a predetermined pattern to assure that a separate and distinct field is viewed in each of the succeeding scans of the slide 26. The recycling of the beam 50 is controlled by the scanner control 42 which is connected to the output of the timing control 40 via lines 80. In operation, a slide 26 is inserted on the platform 24 for examination by the pattern recognition system. As will be seen, certain information is placed directly into the pattern recognition computer by the operator keyboard as the slide is put in place. When slide 26 is placed on the platform 24, the platform 24 is moved until a neutrophil is within the 300 micron × 300 micron field. The START button is then pressed by the keyboard operator which acts to reset the entire system and advise the pattern recognition computer that this is the first cell being scanned. By focusing on a neutrophil and advising the computer system thereof, the first cell can be used to set the thresholds of color and contrast, based on the color of the first neutrophil placed within the field of view of the computer. As the first cell is scanned by the cathode ray tube the beam 50 is provided to the color separator 28 which causes the scanning signal to be provided by the color quantizer and color processor to the main shift registers 34 and to the parameter detector and control via line 84.

The parameter detector and control provides shift signals to the main shift registers 34 and the signals in the main shift registers are examined via lines 62 as the signals representative of the scanned cell are shifted through the main shift registers. The parameters from the parameter detector portion of the parameter and detector control 38 are provided via line 65 to the cell processors which store the cell parameters and after all of the cell parameters have been determined the scanning of the cell is discontinued. The cell parameters are provided to the pattern recognition computer 44 along with the first cell information whereby the decision logic in the pattern recognition computer operates on the parameters provided by the cell processors 36 and provides the identification of the cell scanned via line 70 to the outputs of display 48. After the cell has been completely scanned, the beam 50 is moved to another position wherein the next white cell is scanned and so on until a predetermined number of white cells has been scanned. If, during the scanning of a white cell, the pattern recognition computer cannot identify what the cell is that has been scanned, it provides a signal on one of the lines 70 to the output display 48 which indicates that the pattern scanned cannot be identified, thereby providing an output signal on the output display which indicates that there is a suspect. The scanning means stops and the operator reviews the output display to re-examine the cell scanned. The output display preferably includes a cathode ray tube display of the pattern scanned. The operator can then identify the pattern which has been scanned and provides a coded representation of the pattern by pressing an appropriate button on the operator keyboard 46, which is provided to the pattern recognition computer 44. The decision logic is then varied or adapted in accordance with the data provided to the pattern recognition computer 44 to thereby adapt the sensitivity of the pattern recognition computer based on the deviation from the norms in the slide presently being scanned.

Depending on the type of cell that was determined by the operator, the pattern recognition computer can be adapted to enhance recognition. For example, where an atypical white blood cell has been found, it is quite probable that there may be others of the same type present in the whole blood smear. Accordingly, the normals of this type of cell, each time they are present, can be made to appear as a suspect from the decision logic of the pattern recognition computer. Accordingly, once an atypical of a type of white cell has been found, the pattern recognition computer can be caused to make a suspect of each of the remaining cells of this type found by the pattern recognition computer 44 and thereby allows the operator to be able to look at each of the these cells when they appear during the examination of the cells in the whole blood smear on slide 26.

In a different situation, it may be found that a whole blood smear contains a white blood cell which, though of a slightly different shape, is nonetheless normal. Therefore, when the suspect has been determined by the pattern recognition computer, the operator can enter the type of blood cell that it is, so that each succeeding white blood cell of this type can be recognized by the pattern recognition computer by resetting the threshold in the decision logic chain.

Figure 2:
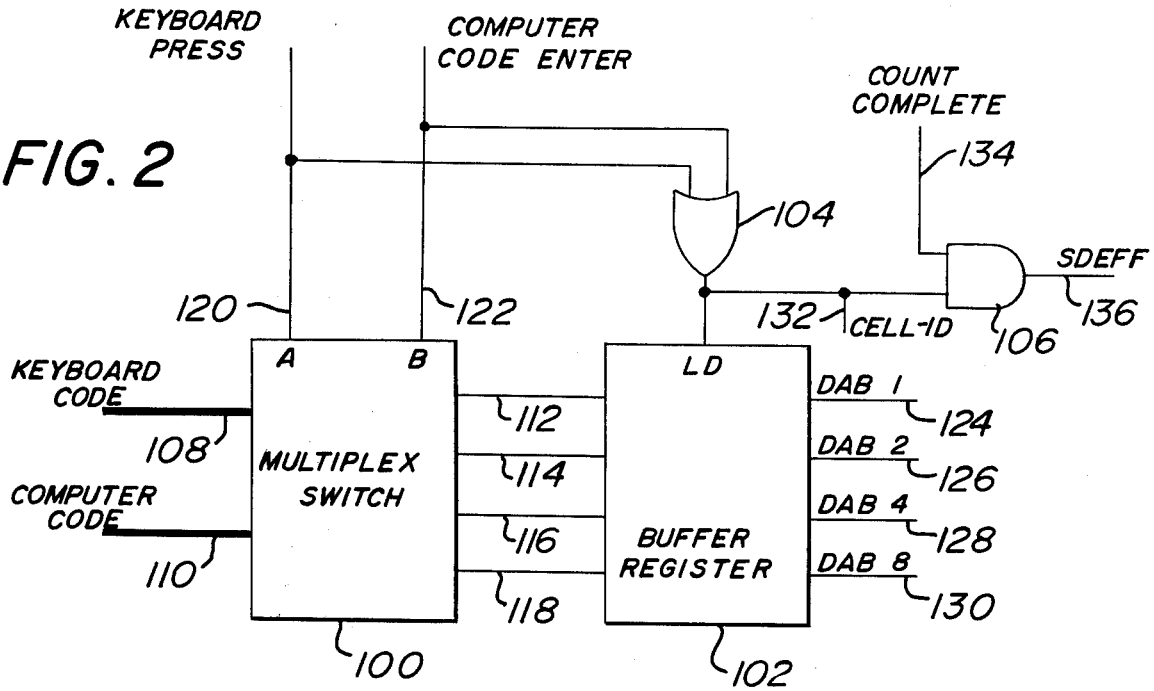
FIGS. 2, 3 and 4 are schematic block diagrams of the portions of the pattern recognition system acting as an interface between the operator keyboard, the cell processors, the pattern recognition computer and the output display.

Referring to FIG. 2, the interface is shown between the cell processors 36 and the pattern recognition computer 44. This includes a multiplex switch 100, a buffer register 102, an OR gate 104 and an AND gate 106. The multiplex switch 100 acts as a switch for the entering of signals on either the keyboard code lines 108 or the computer code provided on lines 110 to the buffer register 102 via lines 112, 114, 116 and 118, which are connected from the output of the multiplex switch 100 to the input of the buffer register 102. Lines 108 are connected from the output of the keyboard to the input of the multiplex switch and provide a four bit code representative of the button pressed on the keyboard. The computer code is provided on four input lines which are part of lines 110, to the multiplex switch 100 from the output of the computer and represent the cell identified by the computer. The multiplex switch 100 includes a pair of inputs A and B, respectively, which are connected to the output of the keyboard and the computer, respectively. The keyboard press line connected to the input A has a high signal provided thereon when a button on the keyboard is pressed to enable the multiplex switch to provide the signals on lines 108 to the input of buffer register 102 via lines 112 through 118. Similarly, when the computer code is entered into the buffer register from the computer a signal is provided on the computer code enter line 122 which causes the multiplex switch 100 to provide the computer code from lines 110 to the buffer register 102 via lines 112 through 118. A high signal on either the keyboard press or the computer code enter lines causes the OR gate 104 to be enabled which causes a loading of the signals on lines 112 through 118 into the buffer register 102. The buffer register 102 includes output lines 124, 126, 128 and 130, respectively, which carry the bits DAB1, DAB2, DAB4 and DAB8. The output of OR gate 104 is connected to not only the LD input or load input of the buffer register 102, but is also connected to an input of AND gate 106 and to the cell-ID line 132. OR gate 104 is enabled when either the keyboard key is pressed or a computer code is being entered into the buffer register 102. When OR gate 104 is enabled and all of the cells have been scanned, a signal is provided on line 134 indicating that the complete count for the whole blood cell differential analysis has been completed, thereby enabling AND gate 106.

The output of AND gate 106 is provided on line 136 which provides the set data entry flip flop (SDEFF) signal.

Figure 3:
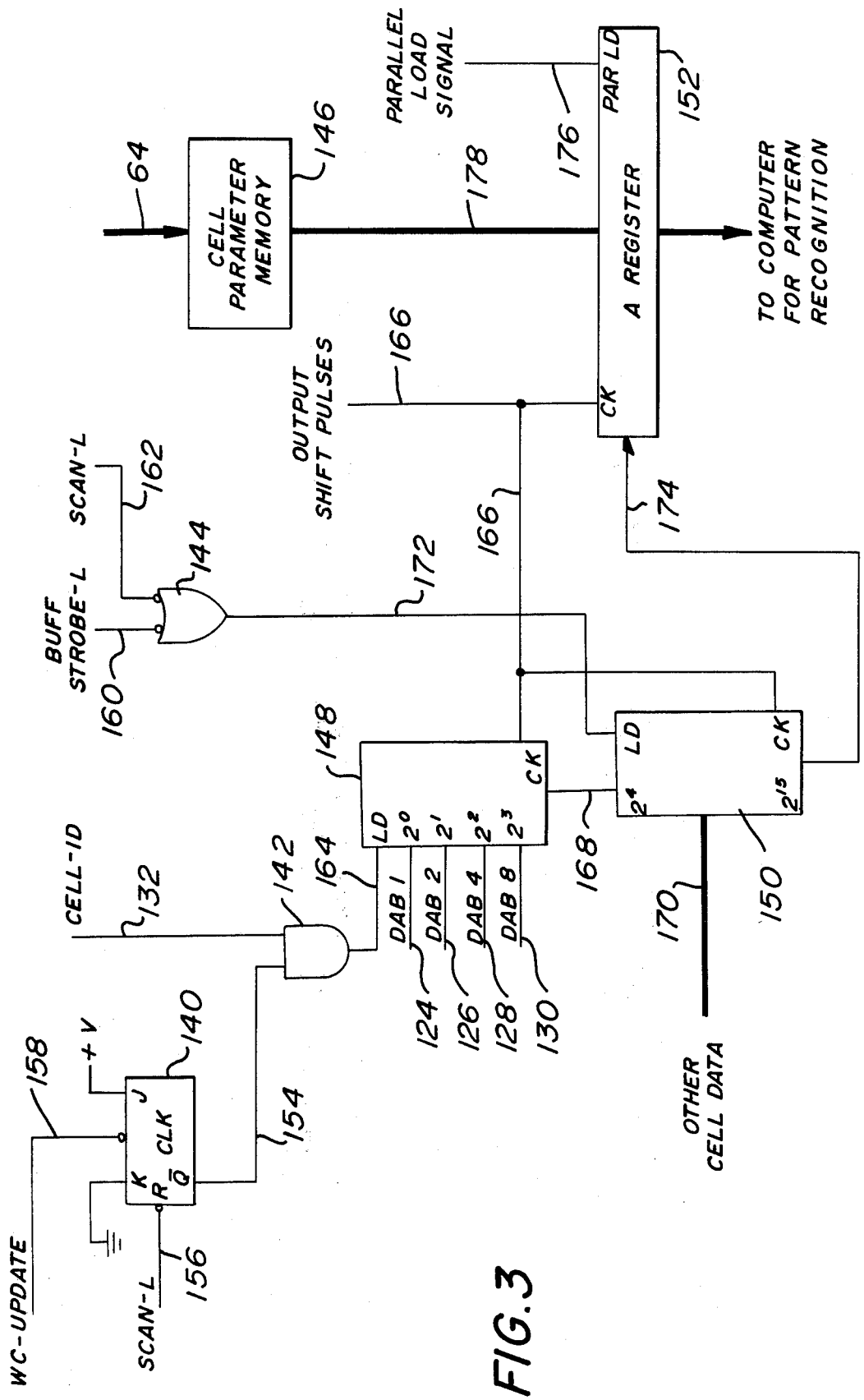

Referring now to FIG. 3 wherein another portion of the interface between the cell processors and pattern recognition computer is shown. The circuitry in FIG. 3 includes flip flop 140, AND gate 142, OR gate 144, cell parameter memory 146, shift registers 148 and 150, A register 152, and the associated input and output lines therewith. The flip flop 140 has its K input connected to ground, its J input connected to positive voltage (+V), the Q output thereof is connected to output line 154, which is in turn connected to the input of AND gate 142, the reset input thereof is connected to line 156 which receives the SCAN-L signal. The trigger input (CK) of flip flop 140 is connected to line 158 which receives the white cell (WC) update signal from the keyboard. The AND gate 142 also includes an input from line 132 which receives the CELL-ID signal generated in FIG. 2 by OR gate 104 when either the keyboard or the computer is entering data into the buffer register 102. OR gate 144 has a first input 160 which receives the buffer strobe low signal and a line 162 at the input thereof which receives the SCAN-L signal from the control 38. Shift register 148 includes a load input line (LD) which has connected thereto line 164 which is the output line of AND gate 142. The shift register 148 also includes inputs $2^0$ through $2^3$ which are connected to the output lines 124, 126, 128 and 130 which receive the DAB1, DAB2, DAB4 and DAB8 signals, respectively. The shift input (CK) of shift register 148 is connected to line 166 which receives the output shift pulses from the parameter detector and control 38. The output of shift register 148 is connected via line 168 to the input of the shift register 150. The shift register 148 is a four bit shift register, the contents of which are shifted out sequentially on line 168 to the input of shift register 150. Shift register 150 includes twelve stages, each of which can be entered via one of the twelve lines comprising cable 170, which is connected to the individual stages of shift register 150. In addition, the contents can be entered sequentially from the output of the $2^3$ stage of shift register 148 into the lowest significant stage of shift register 150, namely the $2^4$ stage. Thus, in combination shift registers 148 and 150 can handle storage of 16 bits. Shift register 150 thus handles the shift register bits in the order of significance of the $2^4$ to the $2^{15}$ respectively. In addition to the individual stage inputs and the input via line 168 from shift register 148, the shift register 150 also includes a load input which is connected to line 172 which is the output of OR gate 144.

The shift input (CK) is connected to line 166 to the output shift pulses which are used for sequentially shifting out the information temporarily stored in shift registers 148 and 150 to the input of the A register 152 via line 174, which is connected therebetween. The cell parameter memory 146 includes a plurality of storage registers which receive in parallel the signals from lines 65 of the parameter detector and control 38. The cell parameter memory stores the various words representative of the parameters found to be present in each of the white cells scanned. The A register includes a clock input which is connected to line 166 and a parallel load (PAR LD) input which is connected to line 176 which receives a parallel load signal when it is intended to dump the words in the cell parameter memory 146 into the A register 152 via lines 178 which are connected from the output of the individual registers in the cell parameter memory 146 to the stages of the A register 152. Because of the location of the shift registers 148 and 150 in a position spaced considerably from the A register 152, it is preferred that the signals stored in shift registers 148 and 150 be transferred to the A register sequentially, thereby requiring only a single line for the transfer of this data. However, it should be understood that the information in registers 148 and 150 could also be shifted in parallel to the A register, as is the data in the cell parameter memory 146.

Figure 4:
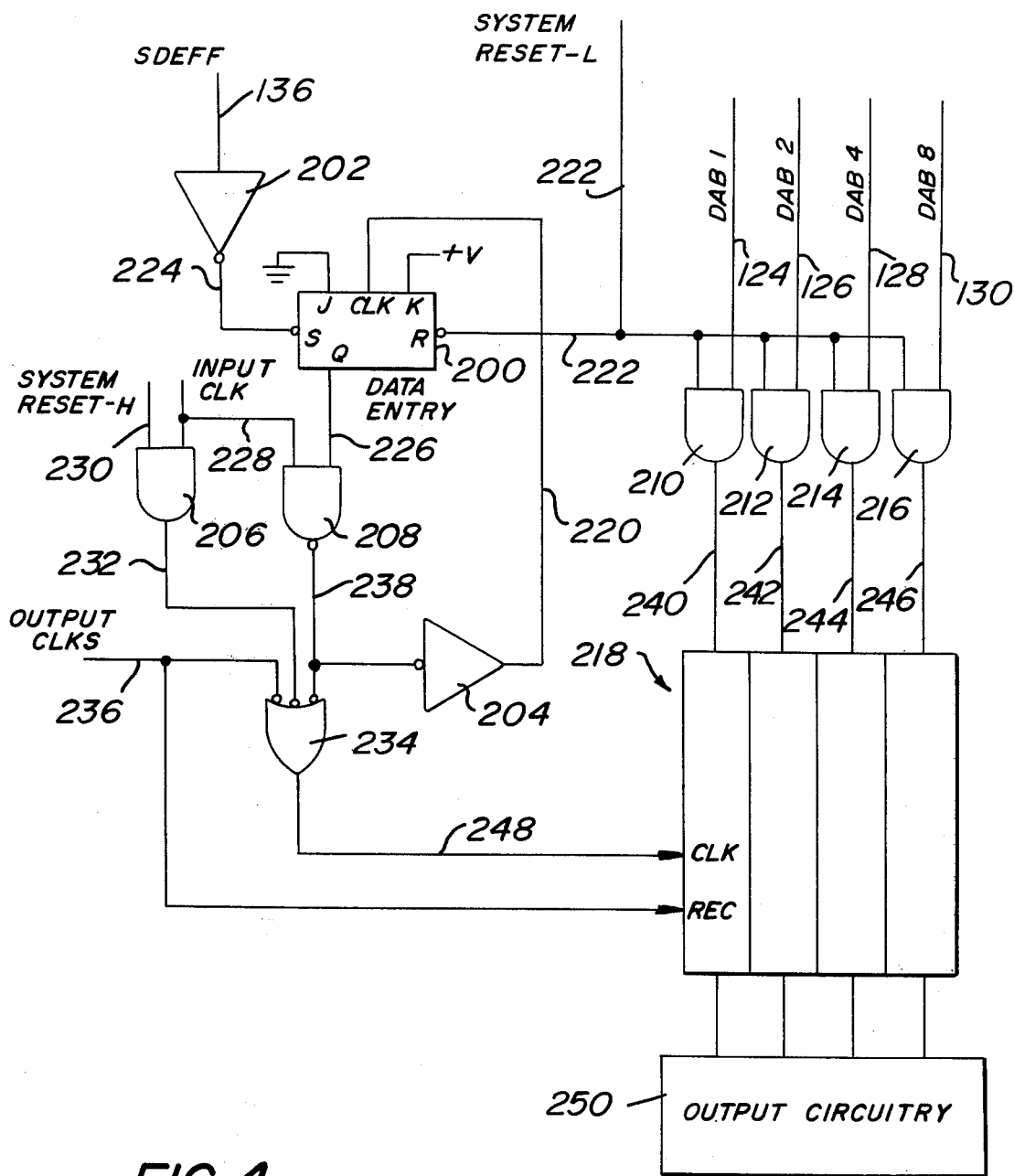

The remaining portion of the interface is shown in FIG. 4. The interface circuitry shown in FIG. 4 includes a data entry flip flop 200, a pair of invertors 202 and 204, six AND gates 206, 208, 210, 212, 214 and 216 and four serial shift registers which act in parallel and are shown as one at 218.

The data entry flip flop 200 has a J input connected to ground, a K input connected to +V, a trigger input (CLK) connected to the output of invertor 204 via line 220, a reset input connected to line 222 which receives the system reset low signal, a set input which is connected to output line 224 of invertor 202 and a Q output which is connected to line 226. The input of invertor 202 is connected to line 136 from FIG. 2, which receives the SDEFF signal and inverts the same to set the data entry flip flop 200. AND gate 208, in addition to receiving the input signal on line 226 from the Q output of the data entry flip flop 200, also receives the clock input signal provided on line 228 which is also connected to one of the inputs of AND gate 206. The second input of AND gate 206 is connected to line 230 which receives the system reset signal which enables the AND gate 206 when it is high. The output of AND gate 206 is connected via output line 232 to OR gate 234. The remaining inputs to OR gate 234 are provided on lines 236 and 238 which receive the output clock pulses and the output of AND gate 208, respectively. The output of AND gate 208 is also connected to the input of invertor 204 via line 238. The output of invertor 204, as previously set forth, is connected via line 220 to the trigger input of the data entry flip flop 200. The system reset line 222 is also connected to one input of each of AND gates 210, 212, 214 and 216. The remaining inputs of the AND gates 210, 212, 214 and 216 are the inputs lines 124, 126, 128 and 130, respectively, which receive the DAB1, DAB2, DAB4 and DAB8 signals, respectively.

The outputs of AND gates 210 through 216 are connected via lines 240, 242, 244 and 246 to the first stage of each of the four shift registers comprising the total register 218. The registers 218 include a clock input which is connected via line 248 to the output of OR gate 234. Each pulse provided on line 248 shifts the signals in all of the shift registers 218 simultaneously to shift the four bit word serially by bit parallel by byte through the shift register and to the output circuitry 250. The output circuitry 250 is utilized to count the types of cells that are provided to the shift registers 218 by the identification circuitry and by keyboard entry as will be seen in greater detail hereinafter. Similarly, the signal on line 236 is also connected to the recirculate input of the shift registers 218 which enables recirculation of the signals stored in the registers 218 to prevent loss thereof as the bits are shifted through the shift registers.

Figure 5:
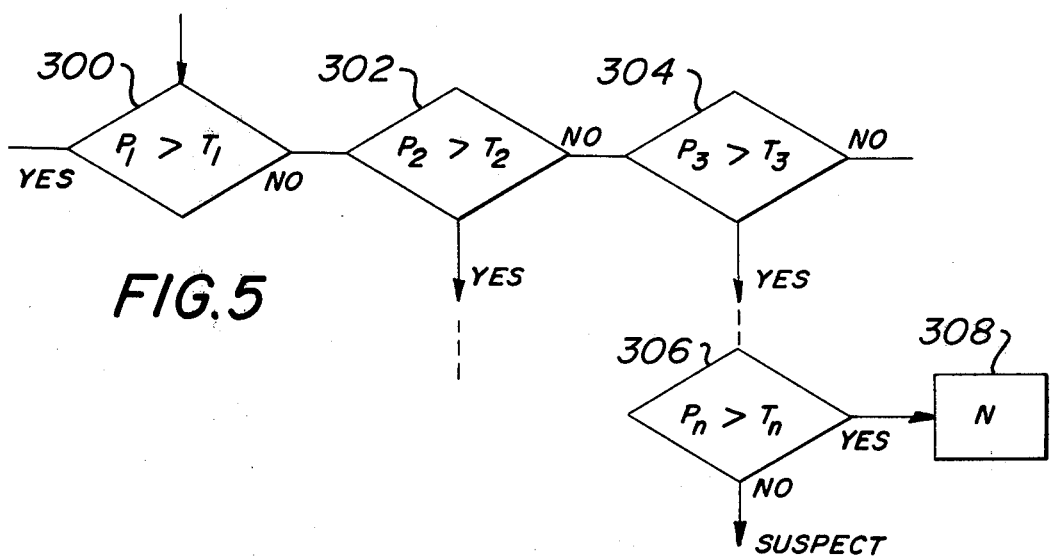
FIG. 5 is a diagrammatic representation of a portion of a decision logic tree for determining the identity of a blood cell type.

Referring now to FIG. 5, a diagrammatic representation of a process for identifying a blood cell is shown. The representation in FIG. 5 is of a decision logic tree which utilizes the parameters provided by the cell processors 36 and via the interface and the A register to the computer for pattern recognition. It should also be understood that FIG. 5 represents only a single path from a large number of branches in a tree having a plethora of branches for determining the various blood cells. The letter P represents parameters and the letter T represents threshold levels. The letter N in the bottom righthand corner of FIG. 5 indicates that a final decision identifying the cell as a cell of type N has been made. Thus, for example, the $P_1$ and $P_2$ represent parameters 1 and 2 provided to the pattern recognition computer, the threshold levels T2 and T3 represent different threshold numbers. The decision tree shown in FIG. 5 includes four decision areas, 300, 302, 304 and 306. The specific tree operates in the following manner:

As a result of a previous decision or at the start of an operation, decision area 300 determines whether parameter 1 is larger than a first threshold number. If P1 is larger than T1, the computer is caused to make a next decision based on the output of the YES line. However, this portion of the decision tree is not shown in FIG. 5, nor is it concerned with the determination of a blood cell of type N. If, however, P1 is smaller than or equal to T1 there is a stop performed by decision area 302 to determine whether a second parameters is larger than a second threshold. Again, if the parameter is larger than the threshold, the decision logic branches off in the YES direction and if the threshold level is greater than or equal to the parameter, it branches off along the NO direction to decision area 304 which determines whether a third parameter is larger than a third threshold. If the answer is YES, then an ultimate decision is made by decision area 306 to determine whether some further parameter is larger than the nth threshold. If it turns out that this ultimate parameter is less or equal to the nth threshold, then it leads to an exit 308 indicating than N has been found.

It can be seen from the above that if any of the required parameters of an N cell are missing, the decision logic in the chain would come to the conclusion that a cell other than an N cell has been examined and the N cell is not identified.

Accordingly, whenever a decision area causes a decision to be exited along the path which is not representative of one of the blood cells that is normally expected in a whole blood smear, it causes a signal to be generated from the computer which is provided to the operator of the system to indicate that there is a suspect cell. This suspect cell is then examined by the operator for the operator's identification.

Figure 6:
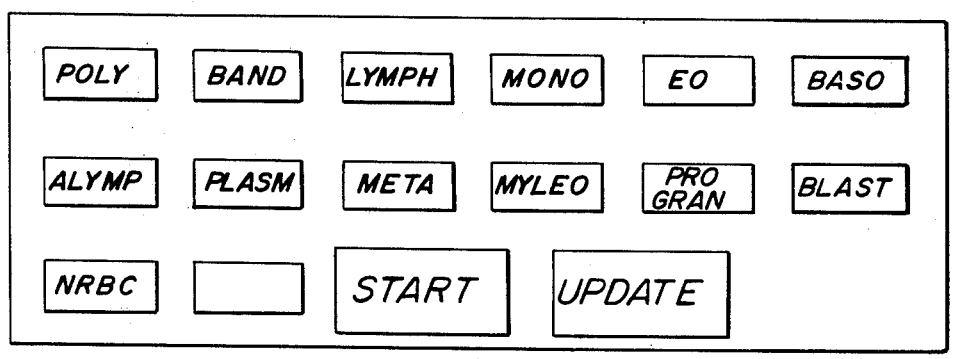
FIG. 6 is a top plan view of a keyboard.

In FIG. 6, a keyboard is shown for use by the operator. The keyboard includes keys with the following legends: POLY, BAND, LYMPH, MONO, EO, BASO, ALYMP, PLASM, META, MYLEO, PROGRAN, BLAST, NRBC, START and UPDATE. With the exception of the START and UPDATE buttons, each of the remaining buttons refer to the type of blood cells which may be found when a cell cannot be identified by the normal automatic operation of the blood cell differential analyzer. Thus, for example, assuming on the slide 26 a blood smear includes a monocyte of slightly abnormal shape, but otherwise healthy, the pattern recognition computer may provide on lines 70 to the output display a signal indicating that it is a suspect cell. The keyboard operator would then examine the cell either under a microscope or on a cathode ray tube display showing the area being scanned and realize that the suspect is a monocyte. Therefore the MONO button is pressed, thereby causing a signal on line 120 and the code for a monocyte to be provided on lines 108 in FIG. 2 to the multiplex switch 100 which causes the signal to be provided to the buffer register 102 via lines 112, 114, 116 and 118. The buffer register then provides the code representative of the monocyte on the lines 124 through 130 to the shift register 148 in FIG. 3. Also, the lines 124 through 130 are provided to the shift registers 218 which store each character which has been examined by the system shown in FIG. 1. It should also be noted that prior to the insertion of the code for a monocyte, the computer code on lines 110 provided to the multiplex switch to FIG. 2 was the code for a suspect which is also provided into shift register 218 via AND gates 210 through 216 in FIG. 4.

Referring now to FIG. 3, it should be noted that during the scanning of a cell the SCAN-L line 156 is low thereby resetting the flip-flop 140. Thus, the $\bar{Q}$ is high and provides via line 154 an enabling signal for AND gate 142. Thus, when there is an identification of the monocyte by the operator by pressing the MONO button, line 132 goes high enabling AND gate 142, which enables the character code for the monocyte to be entered from the buffer register 102 in FIG. 2 into the first four bits of the shift register 148.

After the operator has pressed the button indicative of the type of cell that was found as a suspect, the operator then presses the update button which causes a low signal to be provided on the WC-UPDATE line 158 in FIG. 3 which thereby triggers the flip flop 140 to follow its input leads and thereby be set again by the positive voltage provided to the J input. Thus, AND gate 142 is disabled and does not allow any further code to be placed into shift register 148. The pressing of the UPDATE button also causes the next cell to be scanned by the flying spot scanner, and as the cell is scanned and the binary quantization thereof examined, the parameters are placed in the cell parameter memory 146 until each of the word registers have been filled up with the various parameters relating to the characteristics of the cell scanned.

After each of the words in the cell parameter memory have been completed, a signal is provided to line 176 which causes the words in the cell parameter memory to be stored in the A register 152. After the words from the cell parameter memory have been loaded into the A register 152, shift pulses are provided on line 166 to the shift registers 148 and 150 which cause the serial read in of the data provided in shift registers 148 and 150. In view of the fact that the previous cell scanned was a monocyte and the operator placed the code for monocyte into the shift register 148, the code for the previous cell is provided into the A register along with the parameters relating to the present cell scanned. The A register 152 thus acts as a buffer register to provide to the computer for pattern recognition the data relating to the previous cell scanned along with the words containing the parameters of the present cell scanned.

In addition to the character code for the previous cell scanned being provided via shift register 148, other cell data can be provided to the shift register 150 for insertion along with previous cell data into the buffer register for use by the computer along with cell parameters of the present cell being scanned. For example, as soon as the operator presses the start button at the beginning of each cell, not only is the entire pattern recognition reset to a blank condition, but also a bit is provided into shift register 150 along one of the lines of cables 170 to indicate that the cell scanned is the first blood cell being scanned and therefore must be a neutrophil which enables the threshold levels for the remaining cells to be determined in accordance with the color characteristics of the first neutrophil having been examined by the pattern recognition computer 44.

In addition, the remaining lines 170 provide capability to provide information to shift register 150 and thus on into the computer to provide other characteristics of a blood smear which may be noted by the keyboard operator prior to placing the first neutrophil within the field of view of the pattern recognition system.

The cell data other than the code for the previous cell which has been operator identified is placed into the shift register 150 during the time that a blood cell is being scanned and a low signal is provided on the buffer strobe line 160 to enable OR gate 144. Of course, the data provided via shift registers 148 and 150 are placed in the A register after the cell parameters have been dumped into the A register and then the data is fed along with the parameters to the computer for pattern recognition.

In the case where a monocyte which is otherwise a normal cell, but which for some reason falls out of the normal parameters which are utilized to identify a monocyte, the computer, when it receives the identification of the monocyte along with the next cell is then capable of modifying the threshold value along the branches of the decision tree utilized to detect a monocyte. Thus, a monocyte which contains the same parameters as that monocyte which first was shown up as a suspect can then be recognized automatically the next time similar monocytes are detected during the scanning of the blood smear on that same slide. It should be noted at this point however that once a new slide has been placed into the pattern recognition system, the system is completely reset and the contextural information relating to this slide presently being examined is completely wiped out and a completely new start is made with respect to the next slide.

Another example of how the decision logic in the computer may be changed is where an abnormal or atypical lymphocyte is examined for the first time by the system, it will be identified as a suspect cell. When the operator then examines the atypical lymphocyte and recognizes the same, the operator presses the ALYMP button and thereby puts the code into shift register 148 via multiplex switch 100 and buffer register 102. After the code has been placed into the computer along with the parameters of the next cell, the computer can be updated by this information so that a decision along this decision logic tree which causes a suspect exit will be adapted so that the system automatically prevents any decision being made at that last decision exit to go to an exit other than the suspect. So for example, a lymphocyte which would normally be recognized as a lymphocyte by the decision logic tree would not be recognized but would rather put out a suspect so that the operator would have the opportunity to visually inspect each succeeding lymphocyte which has been identified by the system so that more abnormal lymphocytes can be found if such are present.

Referring to FIG. 5, this would mean that if the N in exit 308 represented a lymphocyte, instead of the system causing the lymphocyte to be recognized when the parameters for a lymphocyte are present, the decision at decision area 306 would cause the decision to exit at the suspect path as opposed to along the No path which lead to the identification of the lymphocyte.

At this juncture, it is important to note that there is no interrelation between the various branches of the decision logic tree provided in the computer. Thus, for example, while in one portion of the logic tree it may be desired to have a decision exit as a suspect, in another portion of the tree it may be desired to loosen up the sensitivity of the machine to enable a recognition of a cell type which is slightly deviated from the norm, but which is nonetheless a healthy cell.

In order to store the cells found in a differential blood cell analysis, the circuitry in FIG. 4 is provided to enable the information provided to the output circuitry to include not only those cells found by automatic identification by the machine, but also by keyboard entry from the analysis of suspects by the operator.

When a cell classification is to be stored, either because the cell is recognized by the pattern recognition decision logic in the computer, or because the operator is entering the classification from the keyboard, the data entry flip flop 200 is set by the receipt of a high signal on the line 136 which receives the SDEFF signal from AND gate 106 in FIG. 2. The count complete signal is low on line 134 only after all of the cells have been scanned for white blood cell differential count. In other words, if one hundred white cells are examined, at the count of one hundred the output signal provided to line 134 goes low to indicate that the count has been completed prior to all one hundred cells having been counted. The signal on line 134 is high, thereby enabling the AND gate 106 each time OR gate 104 is enabled and thereby providing a signal on line 136 which sets the data entry flip flop 200 in FIG. 4. When the data entry flip flop is set, it enables AND gate 208. Thus, the next input clock pulse which is provided via line 228 to AND gate 208 is passed via AND gate 208 to invertor 204 and thereby provides a signal to the clock input of flip flop 200 which resets the flip flop. The pulse provided on the Q output line 226 enables AND gate 208 to provide a pulse to the OR gate 234 which shifts the shift registers 218 and enables the insertion into the first stage of each of the four shift registers comprising shift registers 218, the data provided on the DAB1 through DAB4 lines 124 through 130, via AND gares 219 through 216. Thus, each time a cell has been identified via either the computer or via an operator, the code is placed via AND gates 210 through 216 into shift registers 218. The data entry flip flop prevents more than one code from being placed into the shift register 218 at a time.

The AND gate 206 which is connected to the system reset line 230, is enabled at the initiation of each slide and thereby causes the OR gate 234 to be enabled which also allows the shift registers to be cleared of data by having the entire contents thereof shifted out by the output clock pulses provided via lines 236 and OR gate 234. Also, as the systems reset low line remains low at the initiation of the scan, the AND gates 210 through 216 remain disabled thereby preventing the entry of any data while the clock pulses are provided to clear the memory.

It can therefore be seen that a new and improved pattern recognition system has been provided which enables the pattern recognition computer to be updated in accordance with information provided on a slide to adapt the sensitivity of the pattern recognition system.

The provision of the interface enables the pattern recognition logic to be adapted so that the position along the decision logic tree at which a suspect is determined is moved up so that the pattern recognition logic can be made more sensitive to the identification of suspect blood cells.

In addition, the sensitivity of the circuitry to suspects can be made even more selective by moving back the decision earlier in the decision tree so that, for example, with respect to FIG. 5, the final decision could be moved back from decision area number 306 to decision area 304 or 302.

Instead of increasing the sensitivity the system may also be adapted so that the sensitivity is decreased so that otherwise healthy cells can be recognized readily by the system where the operator has detected that such cells in the specific blood smear tend to be slightly abnormally shaped, though not really abnormal cells.

The independence of the various paths of the decision logic tree enable independent operation of one branch of the tree with respect to the other so that in one whole blood smear analysis the decision tree can be made more critical in one area and less critical in another area.

Another feature of the invention is that the pattern recognition system can be immediately adapted to be sensitive to the fact that a blood cell smear looks extremely abnormal to a keyboard operator. This is determined at the time that the operator looks through the microscope in order to obtain the first neutrophil to start the automatic blood cell scan. Included within this sensitizing of the system is the fact that the operator can notice abnormal red cells which can be used to sensitize the system insofar as the scan of the white cells is concerned.

Without further elaboration the foregoing will so fully illustrate our invention that others may, by applying current or future knowledge, readily adapt the same for use under various conditions of service.

What is claimed as the invention is:

1. In a pattern recognition system including scanning means for generating signals representative of a pattern scanned by said scanning means, means for examining the signals from said scanning means for generating parameters of the pattern scanned, pattern recognition means responsive to said parameters for identifying the pattern scanned and an operator keyboard for entering data relating to patterns scanned, an interface between said means for examining and said pattern recognition means, said interface including first temporary storage means for receiving parameters relating to a pattern being scanned and second temporary storage means for receiving data from said keyboard and buffer storage means for concurrent entry of both said parameters and said data into said pattern recognition means to enable said pattern recognition means to adapt to recognize said pattern and like patterns in accordance with both said parameters and said data.

2. The pattern recognition system of claim 1 wherein said data relates to the previous pattern scanned and said parameters relate to the present pattern scanned.

3. The pattern recognition system of claim 2 wherein parameters are fed in parallel to said buffer storage means and said data is fed serially to said buffer storage means.

4. The pattern recognition system of claim 1 wherein said system further includes a buffer register, the output of which is connected to said second temporary storage means, said buffer register temporarily storing the data from said keyboard prior to transfer to said second temporary storage means.

5. The pattern recognition system of claim 4 wherein a multiplex switch is provided, the inputs of which are connected to the signals from said keyboard and the output of which is connected to the input of said buffer register, said multiplex switch further including inputs from said pattern recognition means and an input for determining which of said input signals are passed to said buffer register.

6. The pattern recognition system of claim 5 wherein said buffer register is also connected to a plurality of shift registers for storing signals representative of the patterns identified by either an operator via said keyboard, or by said pattern recognition means.

7. The pattern recognition system of claim 1 wherein switching means are provided comprised of a bistable storage means which enables said data from said keyboard to be fed into said second temporary storage means after said pattern has been scanned, but prevents any further data entry into said second temporary storage means after a signal has been provided by an operator of said keyboard.

8. In a blood cell recognition system including scanning means for generating signals representative of a blood cell in a whole blood smear scanned by said scanning means, means for examining said signals from said scanning means for generating parameters of the blood cell scanned, pattern recognition means responsive to said parameters for identifying the blood cell scanned and an operator keyboard for entering data relating to blood cells scanned, an interface between said means for examining and said pattern recognition means, said interface including first temporary storage means for receiving parameters relating to a blood cell being scanned and second temporary storage means for receiving data from said keyboard and buffer storage means for entry concurrently of both said parameters and said data into said pattern recognition means to adapt to recognize said blood cell and like blood cells in accordance with both said parameters and said data.

9. The pattern recognition system of claim 8 wherein said data relates to a previous blood cell scanned and said parameters relate to the present blood cell scanned.

10. The pattern recognition system of claim 9 wherein an operator of said system causes said system to scan one particular type of blood cell first, said second temporary storage means receiving a signal indicating said first blood cell is being identified.

* * * * *

UNITED STATES PATENT AND TRADEMARK OFFICE
CERTIFICATE OF CORRECTION

PATENT NO. : 4,048,616

DATED : September 13, 1977

INVENTOR(S) : Donald J. Hart, John E. Bouton. Jr., and Eugene H. Poppel

It is certified that error appears in the above-identified patent and that said Letters Patent are hereby corrected as shown below:

Column 1 Line 13 "3,873,943" should be --3,873,974--.

Column 2 Line 52 "parametr" should be --parameter--.

Column 2 Line 67 and 68 "3x3" should be --3"x3"--

Signed and Sealed this

Third Day of January 1978

[SEAL]

Attest:

RUTH C. MASON
*Attesting Officer*

LUTRELLE F. PARKER
*Acting Commissioner of Patents and Trademarks*